United States Patent
Zhao et al.

(10) Patent No.: US 11,766,784 B1
(45) Date of Patent: Sep. 26, 2023

(54) MOTION CAPTURE METHOD AND SYSTEM OF ROBOTIC ARM, MEDIUM, AND ELECTRONIC DEVICE

(71) Applicant: JIANGNAN UNIVERSITY, Wuxi (CN)

(72) Inventors: Shunyi Zhao, Wuxi (CN); Wei Wang, Wuxi (CN); Xiaoli Luan, Wuxi (CN); Fei Liu, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 0 days.

(21) Appl. No.: 18/083,507

(22) Filed: Dec. 17, 2022

Related U.S. Application Data (63) Continuation of application No. PCT/CN2022/099469, filed on Jun. 17, 2022.

(30) Foreign Application Priority Data

Mar. 8, 2022 (CN) .......................... 202210228647.4

(51) Int. Cl.
*B25J 9/16* (2006.01)
(52) U.S. Cl.
CPC ........... *B25J 9/1697* (2013.01); *B25J 9/1669* (2013.01)
(58) Field of Classification Search
CPC ................. B25J 9/163; B25J 9/1653; B25J 9/1656–1664; B25J 9/1669; B25J 9/1679; B25J 9/1692–1697; G06N 3/096
See application file for complete search history.

(56) References Cited

U.S. PATENT DOCUMENTS

| 11,254,002 B1 | 2/2022 | Ebrahimi Afrouzi et al. |
| 2015/0217444 A1* | 8/2015 | Asada ................... B25J 9/0006 700/258 |

FOREIGN PATENT DOCUMENTS

| CN | 103112007 A | 5/2013 |
| CN | 106182003 A | 12/2016 |
| CN | 111890373 A | 11/2020 |
| CN | 114454174 A | 5/2022 |

* cited by examiner

*Primary Examiner* — Spencer D Patton
(74) *Attorney, Agent, or Firm* — SZDC LAW P.C.

(57) ABSTRACT

The invention provides a motion capture method of a robotic arm, including: fastening a visual sensor on a robotic arm to acquire data as a source domain, fastening an inertial sensor on a corresponding human arm to acquire data as a target domain, and establishing a state space expression of a system; setting an optimal unknown state observed joint distribution by using a total probability theory and an observed prediction distribution of the source domain as a condition, decomposing a conditional joint observed distribution model, and solving an optimal distribution using KL divergence; and transferring knowledge of the source domain measured by the visual sensor into the target domain measured by the inertial sensor based on a Kalman filter and the total probability theory, performing data fusion based on Kalman filtering, and predicting a state of the system at a next moment to implement motion capture of the robotic arm.

6 Claims, 3 Drawing Sheets fastening a visual sensor on a robotic arm to acquire data as a source domain, fastening an inertial sensor on a corresponding human arm to acquire data as a target domain, and establishing a state space expression of a system — S1 setting an optimal unknown state observed joint distribution based on the state space expression and by using a total probability theory and using an observed prediction distribution of the source domain as a condition, decomposing a conditional joint observed distribution model, and solving an optimal distribution by using KL divergence — S2 transferring knowledge of the source domain measured by the visual sensor into the target domain measured by the inertial sensor based on a Kalman filter and the total probability theory, performing data fusion based on Kalman filtering, and predicting a state of the system at a next moment to implement motion capture of the robotic arm — S3

MOTION CAPTURE METHOD AND SYSTEM OF ROBOTIC ARM, MEDIUM, AND ELECTRONIC DEVICE

This application is a Continuation Application of PCT/CN2022/099469, filed on Jun. 17, 2022, which claims priority to Chinese Patent Application No. 202210228647.4, filed on Mar. 8, 2022, which is incorporated by reference for all purposes as if fully set forth herein.

FIELD OF THE INVENTION

The present invention relates to the technical fields of robotic arm motion capture and robotic arm reality synchronization operation, and in particular to motion capture method and system of a robotic arm, a medium, and an electronic device.

DESCRIPTION OF THE RELATED ART

One of the most significant challenges facing the application of robotic arms in industrial production, medicine, and other industries is how to operate the robotic arms. Compared with operations through computer instructions and joysticks, an operation mode of implementing reality synchronization through human motion capture is simpler, more direct, and efficient. Currently used non-contact motion capture is mostly vision-based technology to mark human body parts, track human motion, and therefore control a remote robotic arm through pose analysis and the like. However, there is the problem of marker occlusion, the accuracy of visual acquisition data in dark environment is greatly reduced, and poses cannot be obtained accurately under the impact of light brightness. A mode of vision-based motion capture is greatly limited.

For dynamic robotic arm motion capture, it is more straightforward to track the human body through an exoskeleton sensing system. However, a contact operation mode hinders human motion and is not conducive to actual operations. In a markerless non-contact tracking method, an inertial sensor may be used to obtain pose information of human motion. In inertial navigation, navigation parameters at a current moment are calculated by using known information at a previous moment and measurement information at a current moment. This process is continuously repeated. With the presence of external interference and sensing errors, errors occur in all steps of calculation, and the errors in inertial navigation accumulate over time. Therefore, in the use of a combined navigation mode, a state at a next moment can be predicted to the maximum extent by fusing acquired data.

A data fusion method with knowledge transfer based on a Kalman filter (KF) is used by combining motion capture modes of vision and inertial sensors. The basic principle of transfer learning is to use knowledge information in a source domain to improve learning in a target domain, and transfer learning has been researched in many fields such as autonomous driving, computer vision, and sensor networks. A human motion state can be accurately predicted by using this data fusion method with knowledge transfer to implement motion capture of markerless reality synchronization of robotic arms. However, little research has been conducted in this area.

SUMMARY OF THE INVENTION

A technical problem to be resolved by the present invention is to provide a robotic arm motion capture method that takes deficiencies in visual sensing and inertial sensing into comprehensive consideration and uses visual sensing as a source domain by using the concept of transfer learning to improve a target domain of inertia sensing, thereby improving prediction accuracy.

To resolve the foregoing problem, the present invention provides a motion capture method of a robotic arm, including the following steps:

S1. fastening a visual sensor on a robotic arm to acquire data as a source domain, fastening an inertial sensor on a corresponding human arm to acquire data as a target domain, and establishing a state space expression of a system;

S2. setting an optimal unknown state observed joint distribution based on the state space expression and by using a total probability theory and using an observed prediction distribution of the source domain as a condition, decomposing a conditional joint observed distribution model, and solving an optimal distribution by using KL divergence; and S3. transferring knowledge of the source domain measured by the visual sensor into the target domain measured by the inertial sensor based on a KF and the total probability theory, performing data fusion based on Kalman filtering, and predicting a state of the system at a next moment to implement motion capture of the robotic arm.

As a further improvement to the present invention, in step 1, the state space expression of the system established for motion capture of a human body is as follows:

$$X_i = AX_{i-1} Bu_{i-1} + w_{i-1} \quad (1),$$

$$Z_i = CX_i + v_i \quad (2), \text{ and}$$

$$Z_{i,s} = C_s X_i + v_{i,s} \quad (3),$$

where a motion angle $\theta_i$ and an angular velocity $\dot{\theta}_i$ in a process of arm motion form a state matrix $X_i$ of the system, $Z_i$ is a measurement matrix of the target domain measured by the inertial sensor of the system, and $Z_{i,s}$ is a measurement matrix of the source domain of the system; A, B, C, and $C_s$ are determined by parameter requirements of the system, and $\mu_{i-1}$ is a control input of the system; and $w_{i-1}$ is process noise of the system, and $v_i$ and $v_{i,s}$ are measurement noise, both assumed to be Gaussian white noise meeting that an average value is zero.

As a further improvement to the present invention, step S2 includes:

S21. setting the optimal unknown state observed joint distribution by using the total probability theory and using the observed prediction distribution $f_s$ of the source domain as the condition as follows:

$$m(X_i, Z_i | f_s) = m(Z_i | X_i, f_s) m(X_i | f_s) \quad (4), \text{ and}$$

where it is defined that an ideal state observed distribution model is:

$$m_I(X_n, Z_n) = f(X_n, Z_n) = f(Z_n | X_n) f(X_n) \equiv \prod_{i=1}^{n} f(Z_i | X_i) f(X_i | X_{i-1}); \quad (5)$$

S22. decomposing the conditional joint observed distribution model into:

$$m(Z_n \mid X_n, f_s) = \prod_{i=1}^{n} m(z_i \mid X_i, Z_{i-1}, f_s), \tag{6}$$

$$m(X_n \mid f_s) = \prod_{i=1}^{n} m(x_i \mid X_{i-1}, f_s) = \prod_{i=1}^{n} m(x_i \mid x_{i-1}, f_s), \tag{7}$$

where it is assumed that $m(z_i|X_i, Z_{i-1}, f_s) \equiv f_s(z_{i,s}|Z_{i-1,s})|_{z_{i,s}=z_i}$, and under a specified source domain knowledge condition constraint, the unknown state observed joint distribution in Formula (4) is changed into:

$$m(X_n, Z_n|f_s) = f_s(Z_n)m(X_n|f_s) \tag{8},$$

where $f_s(Z_n)$ is knowledge information that needs to be transferred from the source domain into the target domain, and under a condition that $f_s(Z_n)$ is fixed and known, $m(X_n|f_s)$ becomes the only part that allows design optimization; and S23. solving the optimal distribution by using KL divergence as:

$$m^o(X_n \mid f_s) = \prod_{i=1}^{n} m^o(x_i \mid x_{i-1}, f_s), \tag{9}$$

and $$m^o(x_i \mid x_{i-1}, f_s) \equiv \frac{f(x_i \mid x_{i-1}) \exp\left\{-\int f_s(z_i \mid Z_{i-1,s}) \ln \frac{f_s(z_i \mid Z_{i-1,s})}{f(z_i \mid x_i)} dz_i \right\} \gamma(x_i)}{\gamma(x_{i-1})}, \tag{10}$$

where $\gamma(x_{i-1})$ is a normalization function.

As a further improvement to the present invention, step S3 includes:

S31. assuming that the arm motion in the motion capture of the robotic arm meets a linear Gaussian case as follows:

$$f(x_i|x_{i-1}) \equiv N_{x_i}(Ax_{i-1}, Q) \tag{11},$$

$$f(z_i|x_i) \equiv N_{z_i}(Cx_i, R) \tag{12},$$

$$f(z_{i,s}|x_i) \equiv N_{z_{i,s}}(C_s x_i, R) \tag{13}, \text{ and}$$

performing explicit recursive calculation according to Kalman filtering to obtain a corresponding state prior distribution, a corresponding state posterior distribution, and observed prior distribution, as follows:

$$f(x_i|x_{i-1}) \equiv N_{x_i}(\mu_{i|i}, \Sigma_{i|i}) \tag{14},$$

$$f(x_i|z_{i-1}) \equiv N_{x_i}(\mu_{i|i-1}, \Sigma_{i|i-1}) \tag{15},$$

$$f(z_i|z_{i-1}) \equiv N_{z_i}(z_{i|i-1}, R_{i|i-1}) \tag{16}, \text{ and}$$

$$f(z_{i,s}|z_{i-1,s}) \equiv N_{z_{i,s}}(z_{i|i-1,s}, R_{i|i-1,s}) \tag{17};$$

S32. according to the total probability theory, under a condition that $f_s(Z_n)$ is fixed and known, $m^o(X_n|f_s)$ is a target domain state prediction optimal distribution, where $\gamma(x_{i-1})$ is a normalization function, that is:

$$\gamma(x_{i-1}) \equiv \int f(x_i \mid x_{i-1}) \times \exp\left\{-\int f_s(z_i \mid Z_{i-1,s}) \ln \frac{f_s(z_i \mid Z_{i-1,s})}{f(z_i \mid x_i)} dz_i \right\} \gamma(x_i) dx_i,$$

deriving the normalization function according to the observed prediction distribution:

$$\gamma(x_{i-1}) \propto \exp\left[-\frac{1}{2}\left(x_{i-1}^T S_{i-1|i} x_{i-1} - 2x_{i-1}^T r_{i-1|i}\right)\right], \tag{18}$$

and where a parameter recursion form of $$L \equiv S_{i|i} Q^{\frac{1}{2}} \left(Q^{\frac{T}{2}} S_{i|i} Q^{\frac{1}{2}} + I_{n_x}\right)^{-1} Q^{\frac{T}{2}}$$

is:

$$r_{i-1|i} = A^T(I_{n_x} - L)r_{i|i} \tag{19}, \text{ and}$$

$$S_{i-1|i} = A^T(I_{n_x} - L)S_{i|i} A \tag{20}, \text{ and}$$

it is satisfied that when $i=n-1, \ldots, 2$, $r_{i|i} = r_{i|i+1} + C^T R^{-1} Z_{i|i-1,s}$, $S_{i|i} = C^T R^{-1} C$, when $i=n$, $r_{n|n} = C^T R^{-1} Z_{n|n-1,s}$, $S_{n|n} = C^T R^{-1} C$, recursion of the normalization function represents dynamic transfer of observed information at $n$ moments of the source domain, and the target domain obtains an optimal distribution under this condition; and S33. obtaining the state prediction optimal distribution of the target domain according to a recursion representation form of the normalization function obtained in step S31:

$$m^o(x_i|x_{i-1}, f_s) = N_{x_i}(\mu_i^o, \Sigma_i^o) \tag{21},$$

where $$\mu_i^o = \left(I_{n_x} - \sum_i^o S_{i|i}\right) A x_{i-1} + \sum_i^o r_{i|i}, \quad \sum_i^o = Q^{\frac{1}{2}}\left(Q^{\frac{T}{2}} S_{i|i} Q^{\frac{1}{2}} + I_{n_x}\right)^{-1} Q^{\frac{T}{2}},$$

and an optimal state a priori predicted distribution after transfer of knowledge from the source domain to the target domain for fusion may be obtained according to Formula (14) of the state prior distribution of the KF:

$$\mu_{i|i-1} = \left(I_{n_x} - \sum_i^o S_{i|i}\right) A \mu_{i-1|i-1} + \sum_i^o r_{i|i}, \tag{22}$$

and $$\sum_{i|i-1} = \left(I_{n_x} - \sum_i^o S_{i|i}\right) A \sum_{i-1|i-1} A^T \left(I_{n_x} - \sum_i^o S_{i|i}\right)^T + \sum_i^o. \tag{23}$$

The present invention further provides a computer-readable storage medium, the storage medium including a stored program, where the program performs the foregoing robotic arm motion capture method.

The present invention further provides an electronic device, including: one or more processors, a memory, and one or more programs, where the one or more programs are stored in the memory and are configured to be performed by the one or more processors, and the one or more programs are used for performing the foregoing robotic arm motion capture method.

The present invention further provides a motion capture system of a robotic arm, including the following modules:

a state space expression establishment module, configured to: fasten a visual sensor on a robotic arm to acquire data as a source domain, fasten an inertial sensor on a corresponding human arm to acquire data as a target domain, and establish a state space expression of a system;

an optimal distribution solving module, configured to: set an optimal unknown state observed joint distribution based on the state space expression and by using a total probability theory and using an observed prediction distribution of the source domain as a condition, decompose a conditional joint observed distribution model, and solve an optimal distribution by using KL divergence; and a motion capture module, configured to: transfer knowledge of the source domain measured by the visual sensor into the target domain measured by the inertial sensor based on a KF and by combining the total probability theory, perform data fusion based on Kalman filtering, and predict a state of the system at a next moment to implement motion capture of the robotic arm.

As a further improvement to the present invention, the state space expression of the system established for motion capture of a human body is as follows:

$$X_i = AX_{i-1} Bu_{i-1} + w_{i-1} \quad (1),$$

$$Z_i = CX_i + v_i \quad (2), \text{ and}$$

$$Z_{i,s} = C_s X_i + v_{i,s} \quad (3),$$

where a motion angle $\theta_i$ and an angular velocity $\dot{\theta}_i$ in a process of arm motion form a state matrix $X_i$ of the system, $Z_i$ is a measurement matrix of the target domain measured by the inertial sensor of the system, and $Z_{i,s}$ is a measurement matrix of the source domain of the system; A, B, C, and $C_s$ are determined by parameter requirements of the system, and $u_{i-1}$ is a control input of the system; and $w_{i-1}$ is process noise of the system, and $v_i$ and $v_{i,s}$ are measurement noise, both assumed to be Gaussian white noise meeting that an average value is zero.

As a further improvement to the present invention, the optimal distribution solving module is configured to perform the following steps:

S21. setting the optimal unknown state observed joint distribution by using the total probability theory and using the observed prediction distribution $f_s$ of the source domain as the condition as follows:

$$m(X_i, Z_i | f_s) = m(Z_i | X_i, f_s) m(X_i | f_s) \quad (4), \text{ and}$$

where it is defined that an ideal state observed distribution model is:

$$m_I(X_n, Z_n) = f(X_n, Z_n) = f(Z_n | X_n) f(X_n) \equiv \prod_{i=1}^{n} f(Z_i | X_i) f(X_i | X_{i-1}); \quad (5)$$

S22. decomposing the conditional joint observed distribution model into:

$$m(Z_n | X_n, f_s) = \prod_{i=1}^{n} m(z_i | X_i, Z_{i-1}, f_s), \quad (6)$$

$$m(X_n | f_s) = \prod_{i=1}^{n} m(x_i | X_{i-1}, f_s) = \prod_{i=1}^{n} m(x_i | x_{i-1}, f_s), \quad (7)$$

where it is assumed that $m(z_i|X_i, Z_{i-1}, f_s) \equiv f_s(z_{i,s}|Z_{i-1,s})|_{z_{i,s}=z_i}$, and under a specified source domain knowledge condition constraint, the unknown state observed joint distribution in Formula (4) is changed into:

$$m(X_n, Z_n | f_s) = f_s(Z_n) m(X_n | f_s) \quad (8),$$

where $f_s(Z_n)$ is knowledge information that needs to be transferred from the source domain into the target domain, and under a condition that $f_s(Z_n)$ is fixed and known, $m(X_n|f_s)$ becomes the only part that allows design optimization; and S23. solving the optimal distribution by using KL divergence as:

$$m^o(X_n | f_s) = \prod_{i=1}^{n} m^o(x_i | x_{i-1}, f_s), \quad (9)$$

and $$m^o(x_i | x_{i-1}, f_s) \equiv \quad (10)$$

$$\frac{f(x_i | x_{i-1}) \exp\left\{-\int f_s(z_i | Z_{i-1,s}) \ln \frac{f_s(z_i | Z_{i-1,s})}{f(z_i | x_i)} dz_i\right\} \gamma(x_i)}{\gamma(x_{i-1})},$$

where $\gamma(x_{i-1})$ is a normalization function.

As a further improvement to the present invention, the motion capture module is configured to perform the following steps:

S31. assuming that the arm motion in the motion capture of the robotic arm meets a linear Gaussian case as follows:

$$f(x_i|x_{i-1}) \equiv N_{x_i}(Ax_{i-1}, Q) \quad (11),$$

$$f(z_i|x_i) \equiv N_{z_i}(Cx_i, R) \quad (12),$$

$$f(z_{i,s}|x_i) \equiv N_{z_{i,s}}(C_s x_i, R) \quad (13), \text{ and}$$

performing explicit recursive calculation according to Kalman filtering to obtain a corresponding state prior distribution, a corresponding state posterior distribution, and observed prior distribution, as follows:

$$f(x_i|x_{i-1}) \equiv N_{x_i}(\mu_{i|i}, \Sigma_{i|i}) \quad (14),$$

$$f(x_i|z_{i-1}) \equiv N_{x_i}(\mu_{i|i-1}, \Sigma_{i|i-1}) \quad (15),$$

$$f(z_i|z_{i-1}) \equiv N_{z_i}(z_{i|i-1}, R_{i|i-1}) \quad (16), \text{ and}$$

$$f(z_{i,s}|z_{i-1,s}) \equiv N_{z_{i,s}}(z_{i|i-1,s}, R_{i|i-1,s}) \quad (17);$$

S32. according to the total probability theory, under a condition that $f_s(Z_n)$ is fixed and known, $m^o(X_n|f_s)$ is a target domain state prediction optimal distribution, where $\gamma(x_{i-1})$ is a normalization function, that is:

$$\gamma(x_{i-1}) \equiv \int f(x_i | x_{i-1}) \times \exp\left\{-\int f_s(z_i | Z_{i-1,s}) \ln \frac{f_s(z_i | Z_{i-1,s})}{f(z_i | x_i)} dz_i\right\} \gamma(x_i) dx_i,$$

deriving the normalization function according to the observed prediction distribution:

$$\gamma(x_{i-1}) \propto \exp\left[-\frac{1}{2}\left(x_{i-1}^T S_{i-1|i} x_{i-1} - 2x_{i-1}^T r_{i-1|i}\right)\right], \text{ and} \quad (18)$$

where a parameter recursion form of $$L \equiv S_{i|i}Q^{\frac{1}{2}}\left(Q^{\frac{T}{2}}S_{i|i}Q^{\frac{1}{2}} + I_{n_x}\right)^{-1}Q^{\frac{T}{2}}$$

is:

$$r_{i-1|i} = A^T(I_{n_x} - L)r_{i|i} \quad (19), \text{ and}$$

$$S_{i-1|i} = A^T(I_{n_x} - L)S_{i|i}A \quad (20), \text{ and}$$

it is satisfied that when $i = n-1, \ldots, 2$, $r_{i|i} = r_{i|i+1} + C^T R^{-1} Z_{i|i-1,s}$, $S_{i|i} = C^T R^{-1} C$, when $i = n$, $r_{n|n} = C^T R^{-1} Z_{n|n-1,s}$, $S_{n|n} = C^T R^{-1} C$, recursion of the normalization function represents dynamic transfer of observed information at n moments of the source domain, and the target domain obtains an optimal distribution under this condition; and S33. obtaining the sate prediction optimal distribution of the target domain according to a recursion representation form of the normalization function obtained in step S31:

$$m^o(x_i | x_{i-1}, f_s) = N_{x_i}\left(\mu_i^o, \sum_i^o\right), \quad (21)$$

where $\mu_i^o = \left(I_{n_x} - \sum_i^o S_{i|i}\right)Ax_{i-1} + \sum_i^o r_{i|i}$, $$\sum_i^o = Q^{\frac{1}{2}}\left(Q^{\frac{T}{2}}S_{i|i}Q^{\frac{1}{2}} + I_{n_x}\right)^{-1}Q^{\frac{T}{2}},$$

and an optimal state a priori predicted distribution after transfer of knowledge from the source domain to the target domain for fusion may be obtained according to Formula (14) of the state prior distribution of the KF:

$$\mu_{i|i-1} = \left(I_{n_x} - \sum_i^o S_{i|i}\right)A\mu_{i-1|i-1} + \sum_i^o r_{i|i}, \quad (22)$$

and $$\sum_{i|i-1} = \left(I_{n_x} - \sum_i^o S_{i|i}\right)A\sum_{i-1|i-1}A^T\left(I_{n_x} - \sum_i^o S_{i|i}\right)^T + \sum_i^o. \quad (23)$$

The beneficial effects of the invention are as follows:

The robotic arm motion capture method provides in the present invention takes deficiencies in visual sensing and inertial sensing into comprehensive consideration and uses visual sensing as a source domain by using the concept of transfer learning to improve a target domain of inertia sensing, thereby improving prediction accuracy.

The above description is only an overview of the technical solutions of the present invention. For a clearer understanding of the technical measure of the present invention and implementation according to the content of the specification, and to make the above and other objectives, features, and advantages of the present invention clearer and more comprehensible, detailed description is provided as follows with reference to preferred embodiments and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
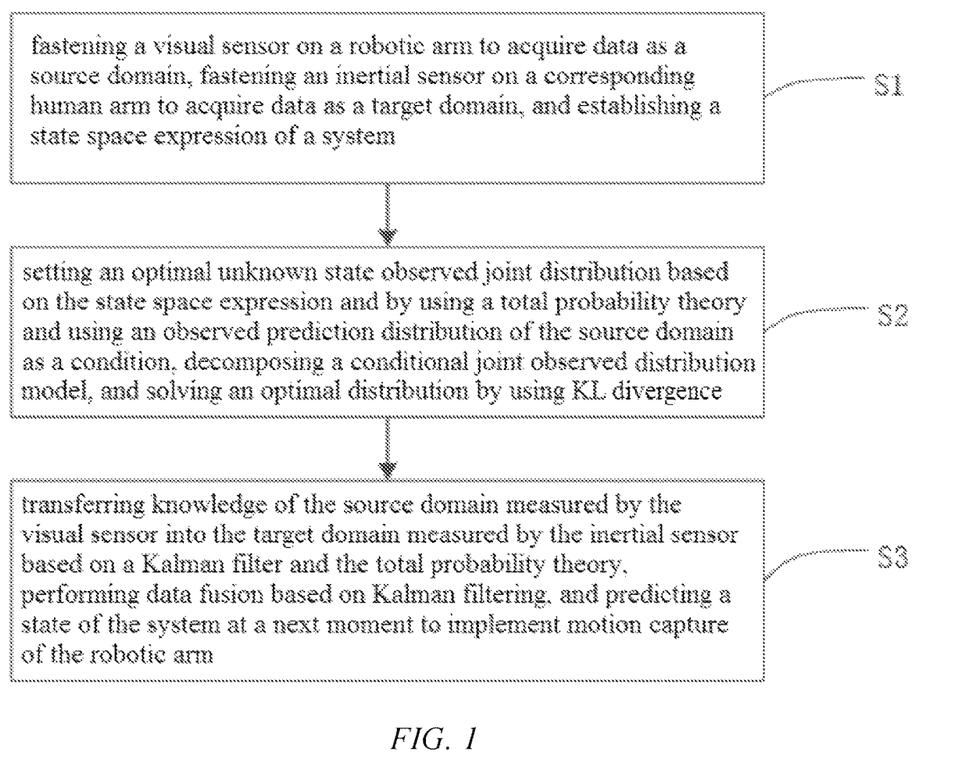
FIG. 1 is a flowchart of a motion capture method of a robotic arm according to a preferred embodiment of the present invention.

As shown in FIG. 1, a motion capture method of a robotic arm according to a preferred embodiment of the present invention includes the following steps:

S1. Fasten a visual sensor on a robotic arm to acquire data as a source domain, fasten an inertial sensor on a corresponding human arm to acquire data as a target domain, and establish a state space expression of a system.

Figure 2:
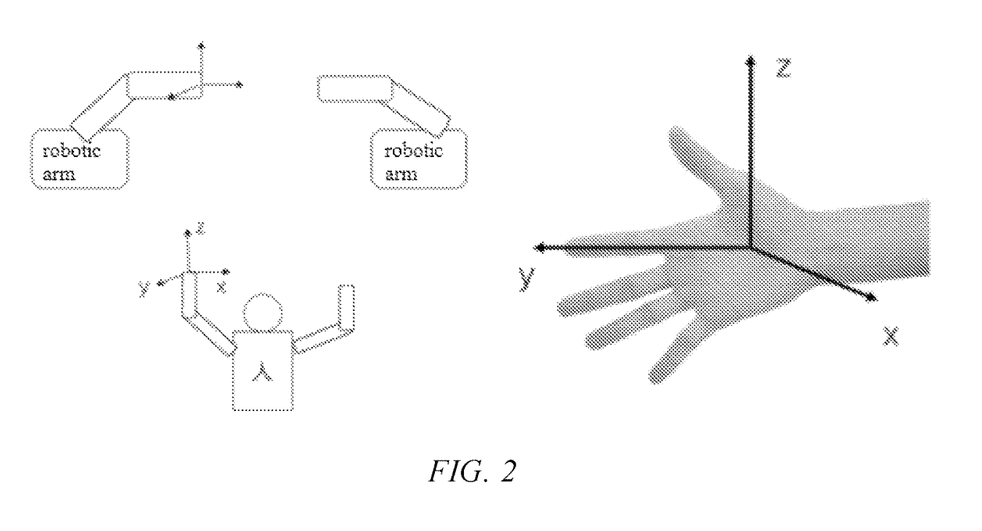
FIG. 2 is a schematic diagram of motion capture model of a robotic arm according to a preferred embodiment of the present invention.

For a human hand of motion capture required for a robotic arm, the three-dimensional position and direction of the center of mass of the hand are used for controlling the position and direction of a robot end effector, as shown in FIG. 2. X, Y, and Z are used as a coordinate system of the human hand, $\phi$, $\theta$, and $\psi$ are defined as a direction yaw angle, a pitch angle, and a roll angle of the hand, $w_x$, $w_y$, and $w_z$ are angular velocity components of the hand on X, Y, Z axes, and a motion direction of the hand is estimated by using a quaternion method. The conversion between a quaternion and a Eulerian angle is as follows:

$$\begin{bmatrix} q_0 \\ q_1 \\ q_2 \\ q_3 \end{bmatrix} = \begin{bmatrix} \cos\left(\frac{\phi}{2}\right)\cos\left(\frac{\theta}{2}\right)\cos\left(\frac{\psi}{2}\right) + \sin\left(\frac{\phi}{2}\right)\sin\left(\frac{\theta}{2}\right)\sin\left(\frac{\psi}{2}\right) \\ \sin\left(\frac{\phi}{2}\right)\cos\left(\frac{\theta}{2}\right)\cos\left(\frac{\psi}{2}\right) - \cos\left(\frac{\phi}{2}\right)\sin\left(\frac{\theta}{2}\right)\sin\left(\frac{\psi}{2}\right) \\ \cos\left(\frac{\phi}{2}\right)\sin\left(\frac{\theta}{2}\right)\cos\left(\frac{\psi}{2}\right) + \sin\left(\frac{\phi}{2}\right)\cos\left(\frac{\theta}{2}\right)\sin\left(\frac{\psi}{2}\right) \\ \cos\left(\frac{\phi}{2}\right)\cos\left(\frac{\theta}{2}\right)\sin\left(\frac{\psi}{2}\right) - \sin\left(\frac{\phi}{2}\right)\sin\left(\frac{\theta}{2}\right)\cos\left(\frac{\psi}{2}\right) \end{bmatrix}.$$

The quaternion satisfies $q_0^2 + q_1^2 + q_2^2 + q_3^2 = 1$. A state space expression of a robotic arm motion capture model is established as follows according to the quaternion method:

$$X_i = AX_{i-1}Bu_{i-1} + w_{i-1} \quad (1),$$

$$Z_i = CX_i + v_i \quad (2), \text{ and}$$

$$Z_{i,s} = C_s X_i + v_{i,s} \quad (3),$$

where $X_i = [q_{0,i}, q_{1,i}, q_{2,i}, q_{3,i}, w_{x,i}, w_{y,i}, w_{z,i}]^T$, a motion angle $\theta_i$ and an angular velocity $\dot{\theta}_i$ in a process of arm motion form a state matrix X of the system, $Z_i$ is a measurement matrix of the target domain measured by the inertial sensor of the system, and $Z_{i,s}$ is a measurement matrix of the source domain of the system; A, B, C, and $C_s$ are determined by parameter requirements of the system, and $u_{i-1}$ is a control input of the system; and $w_{i-1}$ is process noise of the system, satisfying a Gaussian distribution N(0, Q), and $v_i$ and $v_{i,s}$ are measurement noise, satisfying a Gaussian distribution N(0, R), N(0, $R_s$), both assumed to be Gaussian white noise meeting that an average value is zero.

Measurement matrices of the target domain and the source domain:

$$C = C_s = \begin{bmatrix} 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}.$$

State transfer matrix:

$$A_i = \begin{bmatrix} 1 & 0 & 0 & 0 & \frac{-q_{1,i}}{2} & \frac{-q_{2,i}}{2} & \frac{-q_{3,i}}{2} \\ 0 & 1 & 0 & 0 & \frac{q_{0,i}}{2} & \frac{q_{3,i}}{2} & \frac{q_{2,i}}{2} \\ 0 & 0 & 1 & 0 & \frac{q_{3,i}}{2} & \frac{q_{0,i}}{2} & \frac{-q_{1,i}}{2} \\ 0 & 0 & 0 & 1 & \frac{-q_{2,i}}{2} & \frac{q_{1,i}}{2} & \frac{q_{0,i}}{2} \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}.$$

S2. Set an optimal unknown state observed joint distribution based on the state space expression and by using a total probability theory and using an observed prediction distribution of the source domain as a condition, decompose a conditional joint observed distribution model, and solve an optimal distribution by using KL divergence.

S21. Set the optimal unknown state observed joint distribution by using the total probability theory and using the observed prediction distribution $f_s$ of the source domain as the condition as follows:

$$m(X_i, Z_i | f_s) = m(Z_i | X_i, f_s) m(X_i | f_s) \quad (4), \text{ and}$$

where it is defined that an ideal state observed distribution model is:

$$m_I(X_n, Z_n) = f(X_n, Z_n) = f(Z_n | X_n) f(X_n) \equiv \prod_{i=1}^{n} f(Z_i | X_i) f(X_i | X_{i-1}). \quad (5)$$

S22. Decompose the conditional joint observed distribution model into:

$$m(Z_n | X_n, f_s) = \prod_{i=1}^{n} m(z_i | X_{i-1}, Z_{i-1}, f_s), \quad (6)$$

$$m(X_n | f_s) = \prod_{i=1}^{n} m(x_i | X_{i-1}, f_s) = \prod_{i=1}^{n} m(x_i | x_{i-1}, f_s), \quad (7)$$

where it is assumed that $m(z_i | X_i, Z_{i-1}, f_s) \equiv f_s(z_{i,s} | Z_{i-1,s}) |_{z_{i,s} = z_i}$, and under a specified source domain knowledge condition constraint, the unknown state observed joint distribution in Formula (4) is changed into:

$$m(X_n, Z_n | f_s) = f_s(Z_n) m(X_n | f_s) \quad (8),$$

where $f_s(Z_n)$ is knowledge information that needs to be transferred from the source domain into the target domain, and under a condition that $f_s(Z_n)$ is fixed and known, $m(X_n | f_s)$ becomes the only part that allows design optimization.

S23. Solve the optimal distribution by using KL divergence as:

$$m^o(X_n | f_s) = \prod_{i=1}^{n} m^o(x_i | x_{i-1}, f_s), \quad (9)$$

and $$m^o(x_{ji} | x_{i-1}, f_s) \equiv \frac{f(x_i | x_{i-1}) \exp\left\{-\int f_s(z_i | Z_{i-1,s}) \ln \frac{f_s(z_i | Z_{i-1,s})}{f(z_i | x_i)} dz_i \right\} \gamma(x_i)}{\gamma(x_{i-1})}, \quad (10)$$

where $\gamma(x_{i-1})$ is a normalization function.

S3. Transfer knowledge of the source domain measured by the visual sensor into the target domain measured by the inertial sensor based on a KF and by combining the total probability theory, perform data fusion based on Kalman filtering, and predict a state of the system at a next moment to implement motion capture of the robotic arm, specifically including:

S31. Assume that the arm motion in the motion capture of the robotic arm meets a linear Gaussian case as follows:

$$f(x_i | x_{i-1}) \equiv N_{x_i}(A x_{i-1}, Q) \quad (11),$$

$$f(z_i | x_i) \equiv N_{z_i}(C x_i, R) \quad (12),$$

$$f(z_{i,s} | x_i) \equiv N_{z_{i,s}}(C_s x_i, R) \quad (13), \text{ and}$$

perform explicit recursive calculation according to Kalman filtering to obtain a corresponding state prior distribution, a corresponding state posterior distribution, and observed prior distribution, as follows:

$$f(x_i | x_{i-1}) \equiv N_{x_i}(\mu_{i|i}, \Sigma_{i|i}) \quad (14),$$

$$f(x_i | z_{i-1}) \equiv N_{x_i}(\mu_{i|i-1}, \Sigma_{i|i-1}) \quad (15),$$

$$f(z_i | z_{i-1}) \equiv N_{z_i}(z_{i|i-1}, R_{i|i-1}) \quad (16), \text{ and}$$

$$f(z_{i,s} | z_{i-1,s}) \equiv N_{z_{i,s}}(z_{i|i-1,s}, R_{i|i-1,s}) \quad (17);$$

S32. According to the total probability theory, under a condition that $f_s(Z_n)$ is fixed and known, $m^o(X_n | f_s)$ is a target domain state prediction optimal distribution, where $\gamma(x_{i-1})$ is a normalization function, that is:

$$\gamma(x_{i-1}) \equiv \int f(x_i | x_{i-1}) \times \exp\left\{-\int f_s(z_i | Z_{i-1,s}) \ln \frac{f_s(z_i | Z_{i-1,s})}{f(z_i | x_i)} dz_i \right\} \gamma(x_i) dx_i,$$

deriving the normalization function according to the observed prediction distribution:

$$\gamma(x_{i-1}) \propto \exp\left[-\frac{1}{2}\left(x_{i-1}^T S_{i-1|i} x_{i-1} - 2 x_{i-1}^T r_{i-1|i}\right)\right], \quad (18)$$

and where a parameter recursion form of $$L \equiv S_{i|i} Q^{\frac{1}{2}} \left(Q^{\frac{T}{2}} S_{i|i} Q^{\frac{1}{2}} + I_{n_x}\right)^{-1} Q^{\frac{T}{2}}$$

is:

$$r_{i-1|i} = A^T(I_{n_x} - L)r_{i|i} \quad (19), \text{ and}$$

$$S_{i-1|i} = A^T(I_{n_x} - L)S_{i|i}A \quad (20), \text{ and}$$

it is satisfied that when $i=n-1, \ldots, 2$, $r_{i|i} = r_{i|i+1} + C^T R^{-1} Z_{i|i-1,s}$, $S_{i|i} = C^T R^{-1} C$, when $i=n$, $r_{n|n} = C^T R^{-1} Z_{n|n-1,s}$, $S_{n|n} = C^T R^{-1} C$, recursion of the normalization function represents dynamic transfer of observed information at n moments of the source domain, and the target domain obtains an optimal distribution under this condition.

S33. Obtain the state prediction optimal distribution of the target domain according to a recursion representation form of the normalization function obtained in step S31:

$$m^o(x_i \mid x_{i-1}, f_s) = N_{x_i}\left(\mu_i^o, \sum_i^o\right), \quad (21)$$

where $$\mu_i^o = \left(I_{n_x} - \sum_i^o S_{i|i}\right)Ax_{i-1} + \sum_i^o r_{i|i}, \quad \sum_i^o = Q^{\frac{1}{2}}\left(Q^{\frac{T}{2}}S_{i|i}Q^{\frac{1}{2}} + I_{n_x}\right)^{-1}Q^{\frac{T}{2}},$$

and an optimal state a priori predicted distribution after transfer of knowledge from the source domain to the target domain for fusion may be obtained according to Formula (14) of the state prior distribution of the KF:

$$\mu_{i|i-1} = \left(I_{n_x} - \sum_i^o S_{i|i}\right)A\mu_{i-1|i-1} + \sum_i^o r_{i|i}, \quad (22)$$

and $$\sum_{i|i-1} = \left(I_{n_x} - \sum_i^o S_{i|i}\right)A \sum_{i-1|i-1} A^T \left(I_{n_x} - \sum_i^o S_{i|i}\right)^T + \sum_i^o. \quad (23)$$

Through Formulas (18), (21), (22), and (23), a total probability design algorithm of knowledge transfer based on a KF may be obtained, specifically:

A. Source domain knowledge transfer:
1. When $i=n$, $r_{n|n}=C^T R^{-1} z_{n|n-1,s}$, $S_{n|n}=C^T R^{-1} C$:
Substitute $r_{n|n}$, $S_{n|n}$ into Formulas (19) and (20) to obtain $r_{n-1|n}$, $S_{n-1|n}$.
2. When $i=n-1, \ldots, 2$, $r_{i|i}=r_{i|i+1}+C^T R^{-1} z_{i|i-1,s}$, $S_{i|i}=S_{i|i+1}+C^T R^{-1} C$
Substitute into Formulas (19) and (20) to obtain $r_{i-1|i}$, $S_{i-1|i}$.

B. Target domain state prediction
1. When $i=1$, an a priori initial value $\mu_{1|0}$, $\Sigma_{1|0}$ is set to obtain $\mu_{1|1}$, $\Sigma_{1|1}$.
2. When $i=2, \ldots, n$:
Substitute $\mu_{i-1|i-1}$, $\Sigma_{i-1|i-1}$ into Formulas (22) and (23) to obtain $\mu_{i|i-1}$, $\Sigma_{i|i-1}$.
Substitute $\mu_{i|i-1}$, $\Sigma_{i|i-1}$ into Formula (16) to obtain $\mu_{i|i}$, $\Sigma_{i|i}$.

Figure 3:
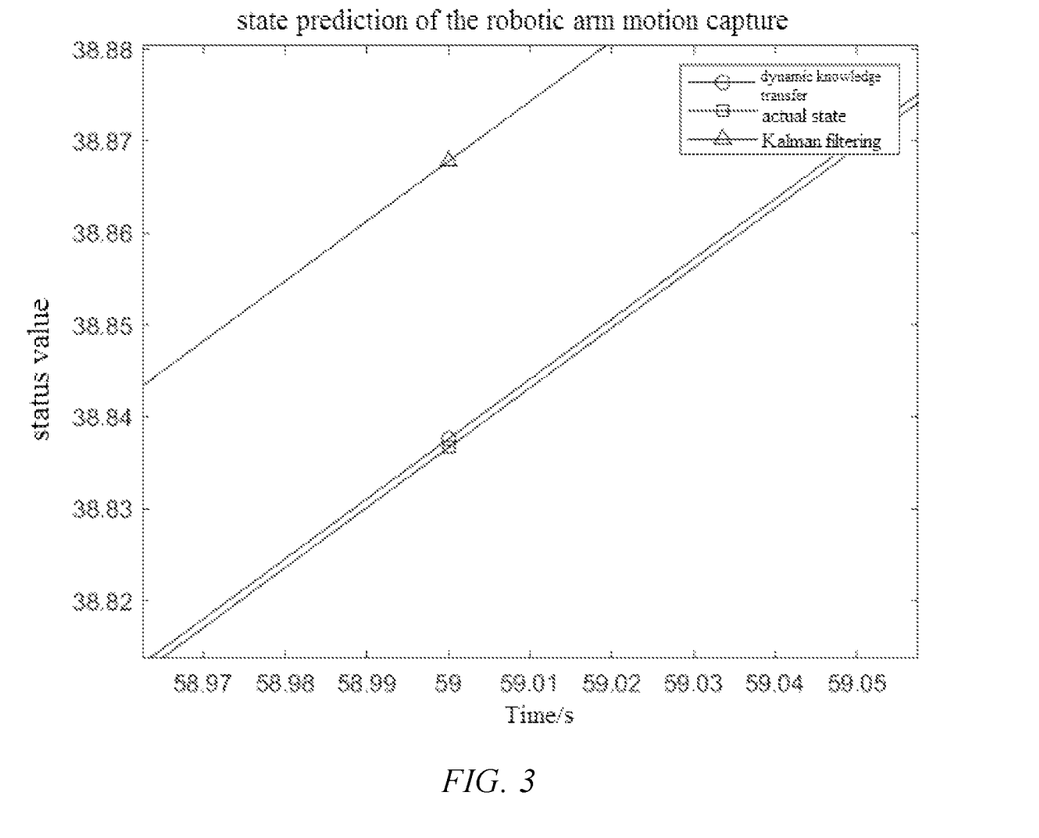
FIG. 3 is a diagram showing simulated comparison between a case when the method of the present invention is not used and after the method of the present invention is used for processing.
Figure 4:
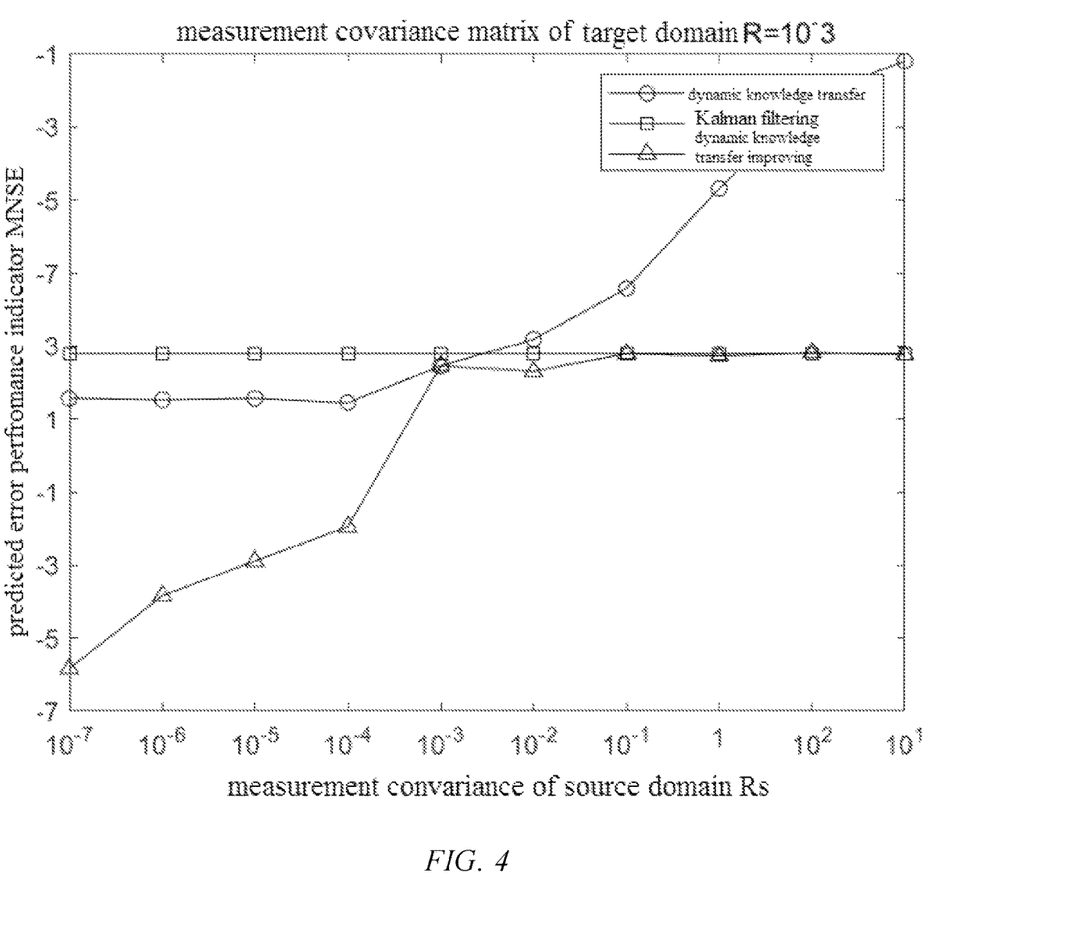
FIG. 4 is a diagram of accuracy comparison of state prediction using the algorithm of the present invention and previous algorithms.

Referring to steps S2 and S3, through the use of the total probability design algorithm of knowledge transfer based on a KF, under a condition of transferring measured prediction knowledge of a source domain, state prediction of a target domain is improved, and measurement data of the target domain is fused to obtain a state estimation value with a better tracking effect to perform effective object tracking, thereby implementing better motion capture. Simulation is performed by using an iterative algorithm, and comparison is made with a conventional method. Root-mean-square deviation indicators (mean norm squared-errors, MNSEs) according to different source domain measurement noise $R_s$ are used for comparison. For the obtained results and simulated diagram, reference is made to FIG. 3, FIG. 4, and the following Table 1:

TABLE 1

|  | $R_S = 10^{-7}I_3$ | $R_S = 10^{-6}I_3$ | $R_S = 10^{-5}I_3$ | $R_S = 10^{-4}I_3$ | $R_S = 10^{-3}I_3$ | $R_S = 10^{-2}I_3$ |
| --- | --- | --- | --- | --- | --- | --- |
| KF | −2.1025 | −2.1025 | −2.1025 | −2.1025 | −2.1025 | −2.1025 |
| DT | −2.7172 | −2.7387 | −2.7182 | −2.7782 | −2.2728 | −1.9064 |
| DTi | −6.4199 | −5.4236 | −4.9413 | −4.4720 | −2.2728 | −2.1125 |

An experimental method of reference comparison is used in a whole simulation process to compare the tracking effects of a case in which the present invention is not used and a case in which dynamic knowledge transfer of the present invention is used. A conventional KF method is compared with the method in the present invention in the case of different measurement noise covariance matrices in a source domain. As can be seen FIG. 3 and FIG. 4, the state estimation performance of dynamic knowledge transfer when a measurement noise covariance matrix of the source domain is greater than that of a target domain is inferior to a conventional method. The dynamic knowledge transfer is insensitive to the measurement prediction of the source domain in a transfer process. Therefore, A (source domain knowledge transfer) of the algorithm based on the total probability design of knowledge transfer based on a KF is replaced with a form of a dynamic knowledge transfer variant (DTi), and the tracking effect is better regardless of a change in the measurement noise covariance matrix of the source domain. Therefore, the knowledge of the source domain is particularly important for the knowledge processing of the target domain in the axiomatic framework of transfer learning, and the total probability design of knowledge transfer based on a KF solves the limitation of a single sensor for robotic arm motion capture and improves the tracking performance of motion capture.

The motion capture method of robotic arm provides in the present invention takes deficiencies in visual sensing and inertial sensing into comprehensive consideration and uses visual sensing as a source domain by using the concept of transfer learning to improve a target domain of inertia sensing, thereby improving prediction accuracy.

Further disclosed in a preferred embodiment of the present invention is a computer-readable storage medium, the storage medium including a stored program, where the program performs the motion capture method of robotic arm in Embodiment 1.

Further disclosed in a preferred embodiment of the present invention is an electronic device. The electronic device includes: one or more processors, a memory, and one or more programs, where the one or more programs are stored in the memory and are configured to be performed by the one or more processors, and the one or more programs are used for performing the motion capture method of robotic arm in Embodiment 1.

Further disclosed in a preferred embodiment of the present invention is a motion capture system of a robotic arm, including the following modules:

a state space expression establishment module, configured to: fasten a visual sensor on a robotic arm to acquire data as a source domain, fasten an inertial sensor on a corresponding human arm to acquire data as a target domain, and establish a state space expression of a system;

an optimal distribution solving module, configured to: set an optimal unknown state observed joint distribution based on the state space expression and by using a total probability theory and using an observed prediction distribution of the source domain as a condition, decompose a conditional joint observed distribution model, and solve an optimal distribution by using KL divergence; and a motion capture module, configured to: transfer knowledge of the source domain measured by the visual sensor into the target domain measured by the inertial sensor based on a KF and by combining the total probability theory, perform data fusion based on Kalman filtering, and predict a state of the system at a next moment to implement motion capture of the robotic arm.

The state space expression of the system established for motion capture of a human body is as follows:

$$X_i = AX_{i-1}Bu_{i-1} + w_{i-1} \quad (1),$$

$$Z_i = CX_i + v_i \quad (2), \text{ and}$$

$$Z_{i,s} = C_s X_i + v_{i,s} \quad (3),$$

where a motion angle $\theta_i$ and an angular velocity $\dot{\theta}_i$ in a process of arm motion form a state matrix $X_i$ of the system, $Z_i$ is a measurement matrix of the target domain measured by the inertial sensor of the system, and $Z_{i,s}$ is a measurement matrix of the source domain of the system; A, B, C, and $C_s$ are determined by parameter requirements of the system, and $u_{i-1}$ is a control input of the system; and $w_{i-1}$ is process noise of the system, and $v_i$ and $v_{i,s}$ are measurement noise, both assumed to be Gaussian white noise meeting that an average value is zero.

The optimal distribution solving module is configured to perform the following steps:

S21. Set the optimal unknown state observed joint distribution by using the total probability theory and using the observed prediction distribution $f_s$ of the source domain as the condition as follows:

$$m(X_i, Z_i | f_s) = m(Z_i | X_i, f_s) m(X_i | f_s) \quad (4), \text{ and}$$

where it is defined that an ideal state observed distribution model is:

$$m_I(X_n, Z_n) = f(X_n, Z_n) = f(Z_n | X_n) f(X_n) \equiv \prod_{i=1}^{n} f(Z_i | X_i) f(X_i | X_{i-1}). \quad (5)$$

S22. Decompose the conditional joint observed distribution model into:

$$m(Z_n | X_n, f_s) = \prod_{i=1}^{n} m(z_i | X_i, Z_{i-1}, f_s), \quad (6)$$

$$m(X_n | f_s) = \prod_{i=1}^{n} m(x_i | X_{-1}, f_s) = \prod_{i=1}^{n} m(x_i | x_{-1}, f_s), \quad (7)$$

where it is assumed that $m(z_i|X_i, Z_{i-1}, f_s) \equiv f_s(z_{i,s}|Z_{i-1,s})|_{z_{i,s}=z_i}$, and under a specified source domain knowledge condition constraint, the unknown state observed joint distribution in Formula (4) is changed into:

$$m(X_n, Z_n | f_s) = f_s(Z_n) m(X_n | f_s) \quad (8),$$

where $f_s(Z_n)$ is knowledge information that needs to be transferred from the source domain into the target domain, and under a condition that $f_s(Z_n)$ is fixed and known, $m(X_n|f_s)$ becomes the only part that allows design optimization.

S23. Solve the optimal distribution by using KL divergence as:

$$m^o(X_n | f_s) = \prod_{i=1}^{n} m^o(x_i | x_{-1}, f_s), \text{ and} \quad (9)$$

$$m^o(x_i | x_{i-1}, f_s) \equiv \\ \frac{f(x_i | x_{i-1}) \exp\left\{-\int f_s(z_i | Z_{i-1,s}) \ln \frac{f_s(z_i | Z_{i-1,s})}{f(z_i | x_i)} dz_i\right\} \gamma(x_i)}{\gamma(x_{i-1})}, \quad (10)$$

where $\gamma(x_{i-1})$ is a normalization function.

The motion capture module is configured to perform the following steps:

S31. Assume that the arm motion in the motion capture of the robotic arm meets a linear Gaussian case as follows:

$$f(x_i|x_{i-1}) \equiv N_{x_i}(Ax_{i-1}, Q) \quad (11),$$

$$f(z_i|x_i) \equiv N_{z_i}(Cx_i, R) \quad (12),$$

$$f(z_{i,s}|x_i) \equiv N_{z_{i,s}}(C_s x_i, R) \quad (13), \text{ and}$$

perform explicit recursive calculation according to Kalman filtering to obtain a corresponding state prior distribution, a corresponding state posterior distribution, and observed prior distribution, as follows:

$$f(x_i|x_{i-1}) \equiv N_{x_i}(\mu_{i|i}, \Sigma_{i|i}) \quad (14),$$

$$f(x_i|z_{i-1}) \equiv N_{x_i}(\mu_{i|i-1}, \Sigma_{i|i-1}) \quad (15),$$

$$f(z_i|z_{i-1}) \equiv N_{z_i}(z_{i|i-1}, R_{i|i-1}) \quad (16), \text{ and}$$

$$f(z_{i,s}|z_{i-1,s}) \equiv N_{z_{i,s}}(z_{i|i-1,s}, R_{i|i-1,s}) \quad (17);$$

S32. According to the total probability theory, under a condition that $f_s(Z_n)$ is fixed and known, $m^o(X_n|f_s)$ is a target domain state prediction optimal distribution, where $\gamma(x_{i-1})$ is a normalization function, that is:

$$\gamma(x_{i-1}) \equiv \int f(x_i | x_{i-1}) \times \exp\left\{-\int f_s(z_i | Z_{i-1,s}) \ln \frac{f_s(z_i | Z_{i-1,s})}{f(z_i | x_i)} dz_i\right\} \gamma(x_i) dx_i,$$

derive the normalization function according to the observed prediction distribution:

$$\gamma(x_{i-1}) \propto \exp\left[-\frac{1}{2}\left(x_{i-1}^T S_{i-1|i} x_{i-1} - 2 x_{i-1}^T r_{i-1|i}\right)\right], \quad (18)$$

and
where a parameter recursion form of $$L \equiv S_{i|i} Q^{\frac{1}{2}} \left( Q^{\frac{T}{2}} S_{i|i} Q^{\frac{1}{2}} + I_{n_x} \right)^{-1} Q^{\frac{T}{2}}$$

is:

$$r_{i-1|i} = A^T(I_{n_x} - L) r_{i|i} \quad (19), \text{ and}$$

$$S_{i-1|i} = A^T(I_{n_x} - L) S_{i|i} A \quad (20), \text{ and}$$

it is satisfied that when i=n−1, ..., 2, $r_{i|i} = r_{i|i+1} + C^T R^{-1} Z_{i|i-1,s}$, $S_{i|i} = C^T R^{-1} C$, when i=n, $r_{n|n} = C^T R^{-1} Z_{n|n-1,s}$, $S_{n|n} = C^T R^{-1} C$, recursion of the normalization function represents dynamic transfer of observed information at n moments of the source domain, and the target domain obtains an optimal distribution under this condition.

S33. Obtain the state prediction optimal distribution of the target domain according to a recursion representation form of the normalization function obtained in step S31:

$$m^o(x_i | x_{i-1}, f_s) = N_{x_i}\left(\mu_i^o, \sum_i^o\right), \text{ where} \quad (21)$$

$$\mu_i^o = \left(I_{n_x} - \sum_i^o S_{i|i}\right) A x_{i-1} + \sum_i^o r_{i|i},$$

$$\sum_i^o = Q^{\frac{1}{2}} \left( Q^{\frac{T}{2}} S_{i|i} Q^{\frac{1}{2}} + I_{n_x} \right)^{-1} Q^{\frac{T}{2}},$$

and an optimal state a priori predicted distribution after transfer of knowledge from the source domain to the target domain for fusion may be obtained according to Formula (14) of the state prior distribution of the KF:

$$\mu_{i|i-1} = \left(I_{n_x} - \sum_i^o S_{i|i}\right) A \mu_{i-1,i-1} + \sum_i^o r_{i|i}, \text{ and} \quad (22)$$

$$\sum_{i|i-1} = \left(I_{n_x} - \sum_i^o S_{i|i}\right) A \sum_{i-1|i-1} A^T \left(I_{n_x} - \sum_i^o S_{i|i}\right)^T + \sum_i^o. \quad (23)$$

The motion capture system of robotic arm in the embodiments of the present invention is configured to implement the foregoing robotic arm motion capture method. Therefore, for specific implementations of the system, reference may be made to the embodiment part of the robotic arm motion capture method above. Therefore, for specific implementations of the system, reference may be made to the description of corresponding embodiment parts. Details are not described again herein.

In addition, the robotic arm motion capture system in this embodiment is configured to implement the foregoing robotic arm motion capture method. Therefore, the functions of the system correspond to the functions of the foregoing method. Details are not described again herein.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A motion capture method of a robotic arm, comprising steps of:
    S1. fastening a visual sensor on a robotic arm to acquire data as a source domain, fastening an inertial sensor on a corresponding human arm to acquire data as a target domain, and establishing a state space expression of a system;
    S2. setting an optimal unknown state observed joint distribution based on the state space expression and by using a total probability theory and using an observed prediction distribution of the source domain as a condition, decomposing a conditional joint observed distribution model, and solving an optimal distribution by using KL divergence; and
    S3. transferring knowledge of the source domain measured by the visual sensor into the target domain measured by the inertial sensor based on a Kalman filter (KF) and the total probability theory, performing data fusion based on Kalman filtering, and predicting a state of the system at a next moment to implement motion capture of the robotic arm.

2. The motion capture method according to claim 1, wherein in step 1, the state space expression of the system established for motion capture of a human body is:

$$X_i = AX_{i-1} + Bu_{i-1} + w_{i-1} \quad (1),$$

$$Z_i = CX_i + v_i \quad (2), \text{ and}$$

$$Z_{i,s} = C_s X_i + v_{i,s} \quad (3),$$

wherein a motion angle $\theta_i$ and an angular velocity $\dot{\theta}_i$ in a process of arm motion form a state matrix $X_i$ of the system, $Z_i$ is a measurement matrix of the target domain measured by the inertial sensor of the system, and $Z_{i,s}$ is a measurement matrix of the source domain of the system; A, B, C, and $C_s$ are determined by parameter requirements of the system, and $u_{i-1}$ is a control input of the system; and $w_{i-1}$ is process noise of the system, and $v_i$ and $v_{i,s}$ are measurement noise, both assumed to be Gaussian white noise with an average value of zero.

3. The motion capture method according to claim 2, wherein step S2 comprises:
    S21. setting the optimal unknown state observed joint distribution by using the total probability theory and using the observed prediction distribution $f_s$ of the source domain as the condition as follows:

$$m(X_i, Z_i | f_s) = m(Z_i | X_i, f_s) m(X_i | f_s) \quad (4), \text{ and}$$

wherein it is defined that an ideal state observed distribution model is:

$$m_I(X_n, Z_n) = f(X_n, Z_n) = f(Z_n | X_n) f(X_n) \equiv \prod_{i=1}^{n} f(Z_i | X_i) f(X_i | X_{i-1}); \quad (5)$$

S22. decomposing the conditional joint observed distribution model into:

$$m(Z_n | X_n, f_s) = \prod_{i=1}^{n} m(z_i | X_i, Z_{i-1}, f_s), \text{ and} \quad (6)$$

$$m(X_n | f_s) = \prod_{i=1}^{n} m(x_i | X_{-1}, f_s) = \prod_{i=1}^{n} m(x_i | x_{-1}, f_s), \quad (7)$$

wherein it is assumed that $m(z_i|X_i, Z_{i-1}, f_s) \equiv f_s(z_{i,s}|Z_{i-1,s})|_{z_{i,s}=z_i}$, and under a specified source domain knowledge condition constraint, the unknown state observed joint distribution in Formula (4) is changed into:

$$m(X_n, Z_n|f_s) = f_s(Z_n)m(X_n|f_s) \qquad (8),$$

wherein $f_s(Z_n)$ is knowledge information that needs to be transferred from the source domain into the target domain, and under a condition that $f_s(Z_n)$ is fixed and known, $m(X_n|f_s)$ becomes the only part that allows design optimization; and S23. solving the optimal distribution by using KL divergence as:

$$m^o(X_n|f_s) = \prod_{i=1}^{n} m^o(x_i|x_{-1}, f_s), \text{ and} \qquad (9)$$

$$m^o(x_i|x_{i-1}, f_s) \equiv \qquad (10)$$

$$\frac{f(x_i|x_{-1})\exp\left\{-\int f_s(z_i|Z_{i-1,s})\ln\frac{f_s(z_i|Z_{i-1,s})}{f(z_i|x_i)}dz_i\right\}\gamma(x_i)}{\gamma(x_{i-1})},$$

wherein $\gamma(x_{i-1})$ is a normalization function.

4. The motion capture method according to claim 3, wherein step S3 comprises:

S31. assuming that the arm motion in the motion capture of the robotic arm meets a linear Gaussian case as follows:

$$f(x_i|x_{i-1}) \equiv N_{x_i}(Ax_{i-1}, Q) \qquad (11),$$

$$f(z_i|x_i) \equiv N_{z_i}(Cx_i, R) \qquad (12), \text{ and}$$

$$f(z_{i,s}|x_i) \equiv N_{z_{i,s}}(Cx_i, R) \qquad (13), \text{ and}$$

performing explicit recursive calculation according to Kalman filtering to obtain a corresponding state prior distribution, a corresponding state posterior distribution, and observed prior distribution, as follows:

$$f(x_i|x_{i-1}) \equiv N_{x_i}(\mu_{i|i}, \Sigma_{i|i}) \qquad (14),$$

$$f(x_i|z_{i-1}) \equiv N_{x_i}(\mu_{i|i-1}, \Sigma_{i|i-1}) \qquad (15),$$

$$f(z_i|z_{i-1}) \equiv N_{z_i}(z_{i|i-1}, R_{i|i-1}) \qquad (16), \text{ and}$$

$$f(z_{i,s}|z_{i-1,s}) \equiv N_{z_{i,s}}(z_{i|i-1,s}, R_{i|i-1,s}) \qquad (17);$$

S32. according to the total probability theory, under a condition that $f_s(Z_n)$ is fixed and known, $m^o(X_n|f_s)$ is a target domain state prediction optimal distribution, wherein $\gamma(x_{i-1})$ is a normalization function, that is:

$$\gamma(x_{i-1}) \equiv \int f(x_i|x_{i-1}) \times \exp\left\{-\int f_s(z_i|Z_{i-1,s})\ln\frac{f_s(z_i|Z_{i-1,s})}{f(z_i|x_i)}dz_i\right\}\gamma(x_i)dx_i,$$

deriving the normalization function according to the observed prediction distribution:

$$\gamma(x_{i-1}) \propto \exp\left[-\frac{1}{2}\left(x_{i-1}^T S_{i-1|i} x_{i-1} - 2x_{i-1}^T r_{i-1|i}\right)\right], \qquad (18)$$

and wherein a parameter recursion form of $$L \equiv S_{i|i} Q^{\frac{1}{2}} \left(Q^{\frac{T}{2}} S_{i|i} Q^{\frac{1}{2}} + I_{n_x}\right)^{-1} Q^{\frac{T}{2}}$$

is:

$$r_{i-1|i} = A^T(I_{n_x} - L)r_{i|i} \qquad (19), \text{ and}$$

$$S_{i-1|i} = A^T(I_{n_x} - L)S_{i|i}A \qquad (20), \text{ and}$$

it is satisfied that when $i=n-1, \ldots, 2$, $r_{i|i} = r_{i|i+1} + C^T R^{-1} Z_{i|i-1,s}$, $S_{i|i} = C^T R^{-1} C$, when $i=n$, $r_{n|n} = C^T R^{-1} Z_{n|n-1,s}$, $S_{n|n} = C^T R^{-1} C$, recursion of the normalization function represents dynamic transfer of observed information at n moments of the source domain, and the target domain obtains an optimal distribution under this condition; and S33. obtaining state prediction optimal distribution of the target domain according to a recursion representation form of the normalization function obtained in step S31:

$$m^o(x_i|x_{i-1}, f_s) = N_{x_i}\left(\mu_i^o, \Sigma_i^o\right), \text{ wherein} \qquad (21)$$

$$\mu_i^o = \left(I_{n_x} - \Sigma_i^o S_{i|i}\right)Ax_{i-1} + \Sigma_i^o r_{i|i},$$

$$\Sigma_i^o = Q^{\frac{1}{2}}\left(Q^{\frac{T}{2}} S_{i|i} Q^{\frac{1}{2}} + I_{n_x}\right)^{-1} Q^{\frac{T}{2}},$$

and an optimal state a priori predicted distribution after transfer of knowledge from the source domain to the target domain for fusion may be obtained according to Formula (14) of the state prior distribution of the KF:

$$\mu_{i|i-1} = \left(I_{n_x} - \Sigma_i^o S_{1,i}\right)A\mu_{i-1,i-1} + \Sigma_i^o r_{i|i}, \text{ and} \qquad (22)$$

$$\Sigma_{i|i-1} = \left(I_{n_x} - \Sigma_i^o S_{i|i}\right)A \Sigma_{i-1|i-1} A^T \left(I_{n_x} - \Sigma_i^o S_{i|i}\right)^T + \Sigma_i^o. \qquad (23)$$

5. A non-transitory computer-readable storage medium, comprising a stored program, wherein the program performs the robotic arm motion capture method according to claim 1.

6. An electronic device, comprising: one or more processors, a memory, and one or more programs, wherein the one or more programs are stored in the memory and are configured to be performed by the one or more processors, and the one or more programs are used for performing the robotic arm motion capture method according to claim 1.

* * * * *